US012761386B2

(12) United States Patent
Xu et al.

(10) Patent No.: US 12,761,386 B2
(45) Date of Patent: Oct. 13, 2026

(54) RESERVOIR PARAMETER PREDICTION METHOD AND APPARATUS BASED ON GEOLOGICAL CHARACTERISTIC CONSTRAINT, AND STORAGE MEDIUM

(71) Applicants: CHINA PETROLEUM & CHEMICAL CORPORATION, Beijing (CN); SINOPEC GEOPHYSICAL RESEARCH INSTITUTE, Nanjing (CN)

(72) Inventors: Kai Xu, Nanjing (CN); Zhentao Sun, Nanjing (CN); Shixing Wang, Nanjing (CN); Jinliang Tang, Nanjing (CN); Huilan Cao, Nanjing (CN); Ruyi Zhang, Nanjing (CN); Xiaoxue Zheng, Nanjing (CN); Ming Yao, Nanjing (CN)

(73) Assignees: CHINA PETROLEUM & CHEMICAL CORPORATION, Beijing (CN); SINOPEC GEOPHYSICAL RESEARCH INSTITUTE, Nanjing (CN)

( * ) Notice: Subject to any disclaimer, the term of this patent is extended or adjusted under 35 U.S.C. 154(b) by 464 days.

(21) Appl. No.: 18/005,011

(22) PCT Filed: Jun. 30, 2021

(86) PCT No.: PCT/CN2021/103487

§ 371 (c)(1),
(2) Date: Jan. 10, 2023

(87) PCT Pub. No.: WO2022/048288

PCT Pub. Date: Mar. 10, 2022

(65) Prior Publication Data

US 2023/0314649 A1 Oct. 5, 2023

(30) Foreign Application Priority Data

Sep. 7, 2020 (CN) ......................... 202010928912.0
Sep. 7, 2020 (CN) ......................... 202010931370.2

(51) Int. Cl.
*G01V 1/50* (2006.01)
*G06N 3/0442* (2023.01)
(Continued)

(52) U.S. Cl.
CPC ............. *G01V 1/50* (2013.01); *G06N 3/0442* (2023.01); *G06N 3/045* (2023.01); *G06N 3/088* (2013.01)

(58) Field of Classification Search
CPC ... G01V 1/50; G01V 1/28; G01V 1/30; G06N 3/0442; G06N 3/045; G06N 3/088
See application file for complete search history.

(56) References Cited

U.S. PATENT DOCUMENTS

2020/0088897 A1 3/2020 Roy et al.
2020/0160173 A1 * 5/2020 Pandey ................. G06F 18/217
(Continued)

FOREIGN PATENT DOCUMENTS

CN 102650702 A 8/2012
CN 103487832 A 1/2014
(Continued)

OTHER PUBLICATIONS

Chopra, Satinder, and Kurt Marfurt. "Seismic Attributes—a promising aid for geologic prediction." CSEG recorder 31, No. 5 (2006): 110-120 (Year: 2006).*
(Continued)

*Primary Examiner* — Douglas Kay
(74) *Attorney, Agent, or Firm* — NKL Law; Allen Xue

(57) ABSTRACT

A method, an apparatus, a computer storage medium and a computer device for geological characteristic constraint-
(Continued)

based reservoir parameter prediction are provided. The method includes: selecting dominant seismic attributes according to the relevance between different types of seismic attributes of a target stratum and reservoir parameters (S100); on the basis of the dominant seismic attributes, classifying seismic waveforms of the target stratum by a preset waveform classification network model and according to waveform features, so as to obtain a waveform classification result (S200); taking the waveform classification result as a constraint, and constructing different deep neural network models corresponding to different geological characteristics (S300); fusing different trained deep neural network models into a set of spatially varying neural network prediction model (S500); and predicting the reservoir parameters of the target stratum.

12 Claims, 9 Drawing Sheets

(51) Int. Cl.
*G06N 3/045* (2023.01)
*G06N 3/088* (2023.01)

(56) References Cited

U.S. PATENT DOCUMENTS

| | | | | |
|---|---|---|---|---|
| 2020/0248540 | A1 | 8/2020 | Madasu et al. | |
| 2021/0181362 | A1 * | 6/2021 | Jiang | G01V 20/00 |

FOREIGN PATENT DOCUMENTS

| | | | | |
|---|---|---|---|---|
| CN | 109799533 | A | 5/2019 | |
| CN | 109828304 | A | 5/2019 | |
| CN | 110349075 | A * | 10/2019 | G06N 3/045 |
| CN | 110383292 | A * | 10/2019 | G06N 3/063 |
| CN | 110462602 | A * | 11/2019 | G06N 3/045 |
| CN | 110546680 | A * | 12/2019 | G06N 3/045 |
| CN | 110582748 | A * | 12/2019 | G06N 3/063 |
| CN | 110927791 | A | 3/2020 | |
| CN | 111025384 | A * | 4/2020 | G01V 1/282 |
| CN | 111239824 | A | 6/2020 | |
| CN | 111488051 | A * | 8/2020 | G06F 9/5027 |

OTHER PUBLICATIONS

Suwatjanapornpong, S., and et al. "Multi-Attributes Analysis and Neural Network: A New Approach of Reservoir Characterisation in Thap Raet and Greater Sirikit East, Phitsanulok Basin." In International Petroleum Technology Conference, p. D031S049R001. IPTC, 2016 (Year: 2016).*

Zhao, Zhongquan et al.; "A Study on Fluid prediction Based on the Classification of Sensitive Seismic Attributes"; journal of southwest Petroleum university(Science & Technology Edition); vol. 38, No. 3; Jun. 30, 2016; ISSN: 1674-5086; pp. 75-81.

Gao, Gai et al.; "Application of neural networks multi-attribute reservoir prediction technology in MZ area"; Proceedings of International Field Exploration and Development Conference 2019, Oct. 16, 2019; pp. 1-6, FEDC-20194238.

Zhu, Jianbing et al., "Predicting fluvial reservoirs using seismic data based on a Bi-recurrent neural network", Geophysical Prospecting for Petroleum, vol. 59, No. 2, Mar. 25, 2020, pp. 250-257.

Tang, Zheng-Yang et al., "Simulating Reservoir Operation Using Recurrent Neural Network Algorithm", Water Resources and Power, vol. 39, No. 5, May 21, 2021, pp. 70, 83-86.

* cited by examiner

| preferred input data | output data | well position |
|---|---|---|
| envelope attribute | low energy | PU_IC |
| relative wave impedance | medium energy | PU_IB |
| Instantaneous amplitude | high energy | PU_IA |

FIG. 8

| preferred input data | |
|---|---|
| seismic trace | thin-layer factor |
| envelope | relative wave impedance |
| Hilbert attribute | instantaneous frequency |
| dominant frequency | instantaneous phase |

RESERVOIR PARAMETER PREDICTION METHOD AND APPARATUS BASED ON GEOLOGICAL CHARACTERISTIC CONSTRAINT, AND STORAGE MEDIUM

CROSS-REFERENCE TO RELATED APPLICATIONS

This application is a U.S. national stage entry of PCT international application PCT/CN2021/103487, filed on Jun. 30, 2021, which claims the priority of Chinese patent application CN 202010928912.0, filed on Sep. 7, 2020 and entitled “reservoir parameter prediction method and apparatus based on geological characteristic constraint, and storage medium”, and the priority of Chinese patent application CN 202010931370.2, filed on Sep. 7, 2020 and entitled “reservoir parameter prediction method and apparatus, storage medium and electronic device”, the content of each is incorporated herein by reference in its entirety.

FIELD OF TECHNOLOGY

The present disclosure relates to the technical field of geophysical exploration, and in particular, to a method, an apparatus, a computer storage medium and a computer device for predicting reservoir parameter based on geological characteristic constraint.

BACKGROUND

With development of prestack depth migration technology and increasingly wide application thereof in seismic data process, reservoir parameter prediction directly performed in a depth domain is of a great significance. Technologies for seismic reservoir prediction in a depth domain include three main technologies in domestic and overseas. A first is a mapping method as a representative technology in Hampson-Russell software company, Geophysical Insight company and BGP company. The technology mainly involves establishing comprehensive network mapping relationship between data of a plurality of attribute and well logging data by a neural network to directly predict reservoir parameters. However, in different sedimentation environments, using the same model to predict may result in low prediction accuracy. Moreover, due to lack of geological characteristic constraint, generalization capability of a prediction model is poor, and a prediction result is prone to overfitting and does not conform to a macroscopic geological law. A second is an inversion method based on depth-domain “wavelet” extraction, as a representative technology in Paradigm company, northwest branch of CNPC, and Shengli Oil-field. The technology mainly involves directly predicting elastic parameters by depth-domain “wavelet” extraction in combination with a conventional inversion technology. However, a theoretical model based on depth-domain data has not been established, and thus, basic theory thereof is insufficient. A third is a depth domain reservoir parameter prediction method on the basis of high-precision velocity conversion, as a representative technology in Jason company. The technology involves converting depth-domain data into time-domain data to perform conventional reservoir parameter prediction. However, depth-time conversion has a certain accumulative conversion error, is time-consuming and labor-intensive, and is not conducive to enhancement of reservoir prediction accuracy.

SUMMARY

For the above technical problems, the present disclosure provides a method, an apparatus, a computer storage medium and a computer device for predicting reservoir parameter based on geological characteristic constraint.

According to a first aspect of the present disclosure, a method for predicting reservoir parameter based on geological characteristic constraint provided in the present disclosure includes: S100, selecting dominant seismic attributes from seismic attributes of different types according to relevance between the seismic attributes of different types of a target stratum and reservoir parameters; S200, on the basis of the dominant seismic attributes, classifying seismic waveforms of the target stratum by a preset waveform classification network model and according to waveform characteristics, so as to obtain a waveform classification result, waveforms of different types correspondingly representing different geological characteristics; S300, constructing different deep neural network models corresponding to the different geological characteristics with the seismic attributes as an input, the reservoir parameters as an output, and the waveform classification result as constraint; S400, training the different deep neural network models by seismic data and well logging data of the target stratum as training data and predicted data, so as to optimize model parameters of each of the deep neural network models; S500, fusing different trained deep neural network models into a set of spatial variation neural network prediction models; and S600, predicting the reservoir parameters of the target stratum by the set of spatial variation neural network prediction model.

According to an embodiment of the present disclosure, the above step S100 includes: determining the relevance between the seismic attributes of different types of the target stratum and reservoir parameters through cross analysis by the seismic data and the well logging data of the target stratum, and selecting seismic attributes, the relevance between which and the reservoir parameters exceeds a preset relevance threshold value, from the seismic attributes of the different types as the dominant seismic attributes, according to a magnitude of the relevance; and decomposing and reconstructing data of each of the dominant seismic attributes through singular spectrum analysis. A sequence component in a reconstructed sequence that has a contribution degree greater than a preset contribution threshold value is reserved as a dominant component of a dominant seismic attribute according to the contribution degree to the dominant seismic attribute.

According to an embodiment of the present disclosure, in the above step S200, the waveform classification network model is an SOM (Self-Organizing Map) unsupervised network model that is designed on a basis of an SOM unsupervised clustering algorithm, and the network model includes a seismic attribute input layer and a classification result output layer.

According to an embodiment of the present disclosure, the geological characteristics include a sedimentation characteristic.

According to an embodiment of the present disclosure, in the above step S300, each of the deep neural network models is an LSTM-RNN (Long Short-Term Memory Recurrent Neural Network) model, and the network model includes a seismic attribute input layer, a reservoir parameter output layer and a hidden layer located between the seismic attribute input layer and the reservoir parameter output layer. The hidden layer includes: an LSTM unit configured to reserve timing characteristics of seismic data and well logging data; a full-connected layer as a classifier of a network training model; a dropout layer configured to alleviate overfitting during a network model training process; and a regression layer as an output of the network training model.

According to an embodiment of the present disclosure, the above step S400 further includes: performing smoothing process on the well logging data, such that the spectrum of the well logging data subjected to the smoothing process matches a spectrum of the seismic data; performing normalization process on the matched seismic data and well logging data; with top and bottom of the target stratum as boundaries, intercepting seismic data and well logging data within a range of the target stratum from the seismic data and the well logging data subjected to the normalization process; and training the different deep neural network models by the seismic data and the well logging data within the range of the target stratum, so as to optimize the model parameters of each of the deep neural network models.

According to an embodiment of the present disclosure, in the above step S500, a spatial variation coefficient of each of trained deep neural network models in the set of spatial variation neural network prediction models is determined on the basis of the waveform similarity and spatial distance.

According to an embodiment of the present disclosure, in the above step S500, different trained deep neural network models are fused to form the set of spatial variation neural network prediction models according to a following formula:

$$V_p(i,j,k)=\begin{cases} w_{1,i,j}\cdot f_1(x_1,x_2,\ldots x_N)\\ w_{2,i,j}\cdot f_2(x_1,x_2,\ldots x_N)\\ \vdots\\ w_{3,i,j}\cdot f_k(x_1,x_2,\ldots x_N)\end{cases}$$

In the formula, $V_p$ represents a reservoir parameter, $f_k(x_1, x_2, \ldots x_N)$ represents a deep neural network model under a k-th type of geological characteristics, $w_{k,i,j}$ represents a spatial variation coefficient of the deep neural network model under the k-th type of geological characteristics, and $x_1, x_2, \ldots x_N$ represents different types of seismic attributes.

According to an embodiment of the present disclosure, a spatial variation coefficient of each of trained deep neural network models in the set of spatial variation neural network prediction models is determined according to a following formula:

$$w=\lambda w_c+(1-\lambda)w_d$$

$$c_{12}=\sqrt{\frac{(v_1-v_2)^T(v_2-v_2)}{v_2^Tv_2}}$$

$$d_{12}=\sqrt{\left(x_{v_1}-x_{v_2}\right)^T\left(x_{v_1}-x_{v_2}\right)}$$

$$w_c=\exp\left(-\alpha_c c_{12}^2\right)$$

$$w_d=\exp\left(-\alpha_d d_{12}^2\right)$$

In the formula, w represents a spatial variation coefficient, $v_1$ represents a seismic trace of a constructed deep neural network model, $v_2$ represents a seismic trace of a deep neural network model to be constructed, $w_c$ represents an interpolation coefficient of similarity between the seismic trace of the constructed deep neural network model and the seismic trace of the deep neural network model to be constructed, $w_d$ represents an interpolation coefficient of a distance between the seismic trace of the constructed deep neural network model and the seismic trace of the deep neural network model to be constructed, $c_{12}$ represents the correlation between $v_1$ and $v_2$, $d_{12}$ represents a distance between the $v_1$ and $v_2$, $x_{v1}$ and $x_{v2}$ respectively represent the spatial positions of $v_1$ and $v_2$, λ represents an adjustment factor, and $\alpha_c$ and $\alpha_d$ represent exponential factors.

According to an embodiment of the present disclosure, the above reservoir parameters of the target stratum include spatial three-dimensional elastic parameter s of the target stratum, and the method further includes outputting a distribution graph of the spatial three-dimensional elastic parameters of the target stratum.

According to a second aspect of the present disclosure, the present disclosure further provides an apparatus for predicting reservoir parameter based on geological characteristic constraint. The apparatus includes: an attribute screening unit configured to analyze relevance between seismic attributes of different types of a target stratum and reservoir parameters by seismic data and well logging data of the target stratum, and to select dominant seismic attributes from the seismic attributes of the different types according to a magnitude of the relevance; a waveform classification unit configured to classify, on a basis of the dominant seismic attributes, seismic waveforms of the target stratum by a preset waveform classification network model and according to waveform characteristics, so as to obtain a waveform classification result, with waveforms of different types correspondingly representing different geological characteristics; a model construction unit configured to construct different deep neural network models corresponding to the different geological characteristics with the seismic attributes as an input, the reservoir parameters as an output, and the waveform classification result as constraint; a model training unit configured to train the different deep neural network models by the seismic data and the well logging data of the target stratum as training data and predicted data, so as to optimize model parameters of each of the deep neural network models; a model fusion unit configured to fuse different trained deep neural network models into a set of spatial variation neural network prediction models; and a parameter prediction unit configured to predict the reservoir parameters of the target stratum by the set of spatial variation neural network prediction models.

According to a third aspect of the present disclosure, the present disclosure further provides a computer storage medium storing thereon a computer program executable by a processor, and the computer program, when executed by the processor, is executed to implement the above method for predicting reservoir parameter based on geological characteristic constraint.

According to a fourth aspect of the present disclosure, the present disclosure further provides a computer device, including a memory and a processor. The processor is used for executing a computer program that is stored in the memory, so as to implement the above prediction method for predicting reservoir parameter based on geological characteristic constraint.

In embodiments, the predicted reservoir parameters may be applied in various reservoir engineering and field development activities. In particular, the prediction results may provide a more accurate and rational P-wave velocity elastic data volume, which is especially useful for guiding well placement and well trajectory design, ensuring that wells are optimally positioned and drilled through the most promising reservoir zones. The predicted parameters may also serve as improved, higher-precision input data for reservoir modeling and reservoir property prediction. More generally, the predicted parameters, such as porosity, permeability, and water saturation, may be used in reservoir characterization to describe the spatial distribution and heterogeneity of the formation, incorporated into geological modeling and numerical simulation to support reserves estimation and production forecasting, and utilized to optimize reservoir management strategies, including drilling design and completion planning. Importantly, the predicted reservoir parameters may be directly applied to a well system operation, such as guiding the selection of drilling trajectories, determining completion intervals, and implementing enhanced recovery techniques. By integrating the prediction results into well system operations, the method can improve decision-making, enhance recovery efficiency, and reduce operational risks in field development.

Compared with the related technology, a violence video classification technology integrated with internal and external knowledge provided in the present disclosure has the following advantages or beneficial effects.

1. In the present disclosure, nonlinear mapping relationship between a seismic attribute and a reservoir parameter is described by an LSTM-RNN neural network model. The vertical association in seismic data and the vertical association in well logging data are taken into consideration, and at the same time, the timing features of the seismic data and the well logging data are also taken into consideration, such that well-to-seismic mapping relationship that is more accurate than that in the related technology is established.
2. In the present disclosure, waveform clustering is introduced, and the same geological characteristic (for example, a sedimentation characteristic) corresponds to one deep network model. A set of spatial variation neural network prediction models is constructed, data of a plurality of types of seismic attributes is as an input, the geological characteristic is as constraint, and different network models under different waveform features are used to perform reservoir parameter prediction, thereby effectively enhancing the prediction accuracy.
3. The present disclosure relates to a nonlinear reservoir parameter prediction technology based on geological characteristic constraint. With the nonlinear reservoir parameter prediction technology, direction prediction in particular for a depth domain reservoir parameter can be realized, the accuracy and spatial stability of prediction of reservoir parameters can be enhanced, thereby contributing to further enhancing drilling success rate, reducing exploration and development costs of an oil field, and increasing production benefit of the oil field.

Other features and advantages of the present disclosure will be described in the following description, and some will become obvious from the description, or understood by implementing the present disclosure. The purpose and other advantages of the present disclosure are realized and obtained by the structures pointed out in the description, the claims and the accompanying drawings.

BRIEF DESCRIPTION OF THE DRAWINGS

FIG. 8 is a schematic diagram of waveform classification input data provided in an embodiment two of the present disclosure;

DETAILED DESCRIPTION OF THE EMBODIMENTS

Since a common depth domain reservoir prediction method at present has defects of low prediction accuracy, low prediction efficiency, inconformity with macroscopic geological characteristics, etc., the present disclosure provides a depth domain reservoir parameter direct prediction technology based on geological characteristic constraint, so as to enhance prediction accuracy in particular of a depth domain reservoir parameter, and to increase stability of spatial prediction, thereby providing reasonable understanding and high accuracy data for subsequent drilling and reservoir simulation to support efficient exploration and development.

Figure 1:
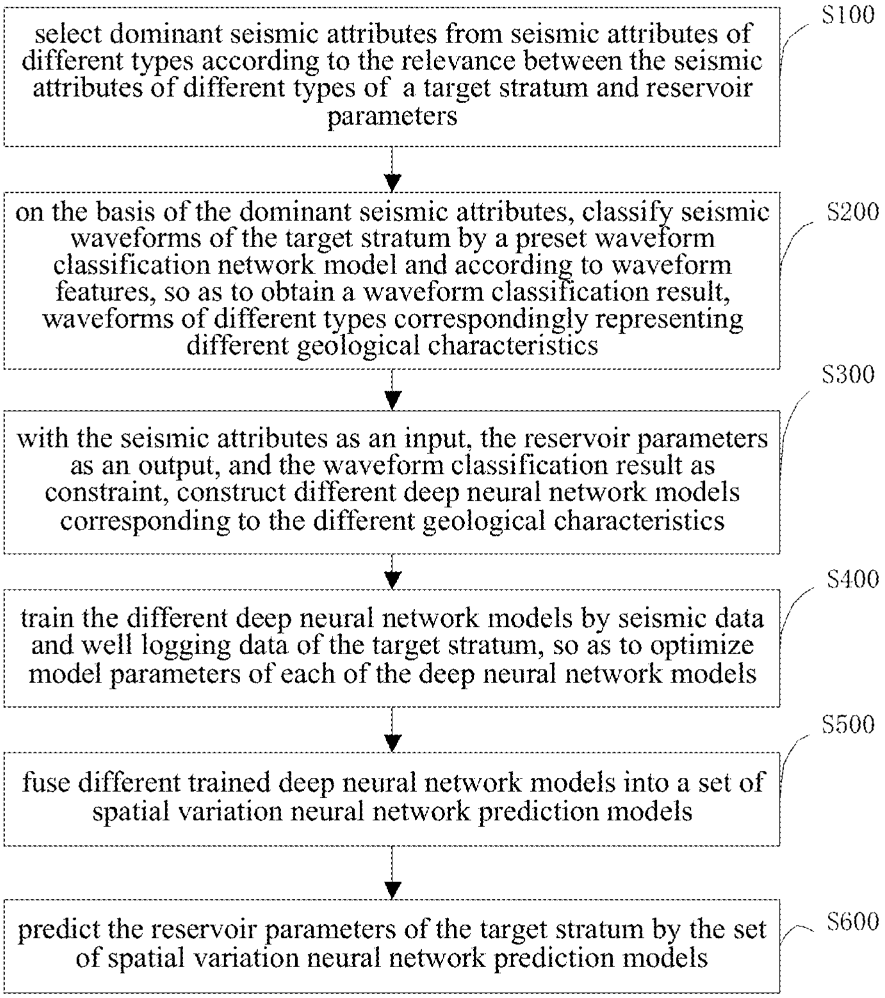
FIG. 1 is a schematic flowchart of a method for predicting reservoir parameter based on geological characteristic constraint provided in an embodiment one of the present disclosure.

The core concept of the present disclosure lies in that: for the problem of relatively low prediction accuracy possibly caused by performing prediction by using the same model, for example, in different sedimentation environments, reservoir parameter prediction is performed by a deep network and by introducing waveform clustering in the same sedimentation characteristic, so as to enhance prediction accuracy. A flow of a main method is as shown in FIG. 1. First, macroscopic geological characteristic zonation is established. Depth domain attributes of a plurality of types such as dynamics, kinematics and geometry are calculated, and are compared with a macroscopic geological background and well logging data, and seismic attributes having high correlation are preferably selected as the division of and a basis for waveform characteristic classification and also as subsequent reservoir parameters for providing a data basis. Then, automatic division of waveform characteristics is realized by combining an automatic clustering algorithm based on SOM unsupervised learning, and different geological characteristics are represented by a waveform classification result as a basis for geological characteristic zonation. Next, different reservoir parameter prediction models are constructed according to different geological characteristics. Under different geological characteristic zonations, nonlinear network prediction models at different well positions are constructed by a long short term memory recurrent neural network (LSTM-RNN) in combination with well logging data and seismic attribute data. Parameter adjustment and model parameter optimization are continuously performed, such that a single-point prediction module is generalized and converges. Finally, a set of spatial variation neural network prediction models is constructed. With data of seismic attributes of a plurality of types as an input and geological characteristics as constraint, reservoir parameter prediction is performed by different network models under different waveform characteristics, so as to finally obtain a comprehensive prediction result of three-dimensional spatial parameters.

In order to make the objectives, technical solutions and advantages of the present disclosure clearer, the present disclosure will be further described in details below in combination with the embodiments and the accompanying drawings, so as to enable the implementation process of how to apply technical means for solving technical problems and achieving technical effects to be fully understood and implemented.

Definitions of Terms

For clarity, the following terms are specifically defined in the disclosure:

"Reservoir parameters" refer to quantitative physical parameters characterizing reservoir properties, which are obtained through geophysical inversion and are used as label data in model training. Specifically, the reservoir parameter is defined as an elastic or petrophysical parameter, with the longitudinal wave velocity (P-wave velocity, Vp) being the parameter used in the embodiments. Reservoir parameters are thus distinct from seismic attributes, which serve as input features.

"Seismic attributes" refer to characteristic quantities derived from seismic data that describe the geometric, physical, or spectral features of the seismic signal. Examples include RMS amplitude, instantaneous amplitude, dominant frequency, bandwidth, instantaneous phase, cosine phase, relative impedance, and absolute impedance.

It is clarified that, in the disclosure, seismic attributes are employed as input data to neural network models, while reservoir parameters represent target output labels derived from geophysical inversion. Accordingly, seismic attributes and reservoir parameters are distinct and are not interchangeable.

"Waveform features" refer to morphological features extracted from seismic waveforms, including raw seismic samples (time series), instantaneous attributes (e.g., instantaneous amplitude and instantaneous phase), and spectral features derived from short-time Fourier transform or other frequency analyses.

"Waveforms of different types" refer to the representative classes of seismic waveforms corresponding to distinct geological characteristics in the target survey area. In practice, the survey area is first analyzed to identify several typical geological facies and their corresponding waveform patterns. Based on this classification, a waveform classification network model can be trained, in which waveform features and dominant seismic attributes are taken as input, and accordingly a waveform class (e.g., low-energy, medium-energy, or high-energy) may be output. This relationship ensures that the waveform classification result serves as a constraint when constructing and fusing the deep neural network models.

It is clarified that waveform attributes may be considered as a subset of seismic attributes that specifically describe the shape and form of the seismic waveform, such as envelope attribute, instantaneous amplitude, or relative impedance.

"Seismic data" refer to reflection signals acquired at the surface through seismic surveys, i.e., reflection wave records.

"Well logging data" refer to physical parameters directly measured in boreholes, such as acoustic travel time, density, porosity, and other in-situ measurements.

It is clarified that seismic data provide large-scale subsurface reflection information, whereas well logging data provide localized in-situ measurements. In the disclosed technology, both datasets are jointly used for training and optimization of the neural network models.

In the disclosure, "constructing different deep neural network models corresponding to different geological characteristics" means that the training data are partitioned according to the waveform classification results and geological facies. Each partitioned dataset, defined by its seismic attributes as input and reservoir parameters as output, is used to train a separate neural network model. Different models therefore do not simply share the same input and output; rather, each model corresponds to a specific geological characteristic, and the waveform classification result is used as a constraint to determine which data subset belongs to each model.

Embodiment One

As shown in FIG. 1, a method for predicting reservoir parameter based on geological characteristic constraint provided in the present disclosure includes the following steps.

At S100, dominant seismic attributes are selected from seismic attributes of different types according to relevance between the seismic attributes of different types of a target stratum and reservoir parameters.

Specifically, at first, the relevance between the seismic attributes of different types of the target stratum and the reservoir parameters is determined through cross analysis and by using seismic data and well logging data of the target stratum; and seismic attributes, the relevance between which and the reservoir parameters exceeds a preset relevance threshold value, are selected, as dominant seismic attributes, from the seismic attributes of different types based on a magnitude of the relevance. Then, data of each of the seismic attributes is decomposed and reconstructed through singular spectrum analysis. According to contribution to a seismic attribute, a sequence component, which has a contribution degree greater than a preset contribution threshold value in a reconstructed sequence, is reserved as a dominant component of a dominant seismic attribute.

In some implementations, the method further includes the acquisition of basic subsurface data, including well logging data and seismic data.

With respect to the well logging data, the data primarily comprises P-wave velocity obtained through acoustic logging. In one example, an acoustic source positioned in the borehole may be used to generate P-waves, and receivers disposed in the borehole record the arrival times of the propagated waves. By calculating the travel-time differences, the P-wave velocity may be determined. Suitable acoustic sources may include monopole or dipole transmitters. The well logging data, in particular the P-wave velocity, may be used as label data for training the model.

With respect to the seismic data, the data may include three-dimensional seismic data acquired through the active excitation of artificial seismic sources. The resulting seismic wave responses propagating through the subsurface are recorded and subsequently processed in a data processing center to generate three-dimensional seismic volumes. In some embodiments, seismic traces adjacent to the well (i.e., well tie seismic traces) may be utilized as sample data for model training. The three-dimensional seismic data and its derived attributes may be used both as input data for waveform clustering (e.g., self-organizing maps, SOM) and as input data for reservoir prediction models.

Alternatively or additionally, a three-dimensional P-wave velocity volume may be generated. Such a velocity volume can significantly enhance spatial prediction accuracy and provide high-quality input for subsequent reservoir property predictions, such as porosity and water saturation, as well as offer valuable guidance for optimal well placement.

Accordingly, the well logging data, such as the P-wave velocity, may be used as normalized label data for model training. The seismic data may further be applied in multiple ways. In one aspect, the seismic attributes may be provided as input for waveform clustering techniques, such as self-organizing maps (SOM), where representative attributes may include envelope attribute, relative acoustic impedance, and instantaneous amplitude. In another aspect, the seismic data may be provided as input for reservoir property prediction, for example through neural network training and prediction, where the input attributes may include seismic traces, thin-bed factor, envelope attribute, relative acoustic impedance, Hilbert attribute, instantaneous frequency, instantaneous phase, and dominant frequency.

The dominant seismic attributes that have been decomposed and reconstructed will be used for waveform clustering analysis and process at step S200.

At S200, on the basis of the dominant seismic attributes, seismic waveforms of the target stratum are classified by a preset waveform classification network model and according to waveform features, so as to obtain a waveform classification result, and different waveforms correspond to different geological characteristics.

At S300, with the seismic attributes as an input, the reservoir parameters as an output, and the waveform classification result as constraint, different deep neural network models corresponding to the different geological characteristics are constructed.

At S400, the different deep neural network models are trained by the seismic data and the well logging data of the target stratum as training data and predicted data, so as to optimize model parameters of each of the deep neural network models.

In a specific application, the seismic data and the well logging data may further be preprocessed firstly in order to further enhance the accuracy of a prediction result. For example, smoothing process is performed on the well logging data, such that the spectrum of the well logging data that has been subjected to the smoothing process matches the spectrum of the seismic data. Normalization process is performed on the matched seismic data and well logging data. With top and bottom of the target stratum as boundaries, the seismic data and well logging data within a range of the target stratum are intercepted from the seismic data and the well logging data which have been subjected to the normalization process. Then, the different deep neural network models are trained by the seismic data and the well logging data within the range of the target stratum, so as to optimize the model parameters of each of the deep neural network models.

At S500, different trained deep neural network models are fused to form a set of spatial variation neural network prediction models. A spatial variation coefficient of each of the trained deep neural network models in the set of spatial variation neural network prediction models is determined by waveform similarity and a spatial distance. Conventionally, in some embodiments, the fusion of different trained neural network models may be performed through weighted averaging, where the weights are determined according to waveform similarity and spatial distance. Upon waveform classification, seismic traces are grouped into geological categories, and a separate local neural network model is trained for each category. When making predictions at a new location, the outputs of several relevant local models are combined. Models that are associated with waveforms more similar to the target location and that are geographically closer receive larger weights in the fusion. This ensures that the final prediction reflects both local geological characteristics and spatial continuity.

The waveform classification result constrains the fusion process by determining which local models are eligible to participate. For example, when the classification indicates that the waveform corresponds to a sedimentary facies, only the models trained for sedimentary data are selected for fusion. Models belonging to unrelated geological facies are excluded. This mechanism ensures that the fusion process respects geological consistency and avoids introducing bias from irrelevant models.

In further embodiments, ensemble learning techniques such as Bagging or Stacking may be optionally incorporated into the fusion framework. In Bagging, multiple models are trained on different resampled subsets of the seismic data within a given geological class, and their predictions are combined according to the spatial variation weighting described above. In Stacking, the predictions of several local models are used as inputs to a higher-level meta-model, which learns to optimize the final prediction. The meta-model only accepts inputs from models corresponding to the geological class identified by waveform classification, and cross-validation can be applied to improve generalization.

At S600, the reservoir parameters of the target stratum are predicted by the set of spatial variation neural network prediction models.

The steps will be described below in details.

(1) Step S100 relates to a technology for preferably selecting seismic attributes on the basis of cross analysis and singular spectrum analysis. In this step, cross analysis is first performed on the seismic attributes of different types of the target stratum and the reservoir parameters, and attributes that have higher correlation or greater contribution are preferably selected. Then, the preferably selected seismic attributes are represented as one-dimensional data, and a trajectory matrix is constructed. The trajectory matrix is further decomposed and reconstructed, and different elements and different components of the attributes are re-sorted according to contribution degree. In final, dominant components of the dominant seismic attributes are determined, so as to provide a data basis for subsequent waveform classification and reservoir parameter direct prediction. An algorithm of singular spectrum analysis is as follows.

①. Embedding is performed, and preferably selected attribute data is represented as one-dimensional data:

$$[x_1, x_2, \ldots, x_N]$$

where N represents a sequence length.

Firstly, a suitable window length L is selected, and an original time sequence is arranged in a lagging manner to obtain a trajectory matrix:

$$X = \begin{bmatrix} x_1 & x_2 & \ldots & x_{N-L+1} \\ x_2 & x_3 & \ldots & x_{N-L+2} \\ \vdots & \vdots & & \vdots \\ x_L & x_{L+1} & \ldots & x_N \end{bmatrix} \tag{1}$$

In general, L<N/2, and provided K=N−L+1, the trajectory matrix X is a matrix of L×K:

$$X = \begin{bmatrix} x_1 & x_2 & \ldots & x_K \\ x_2 & x_3 & \ldots & x_{K+1} \\ \vdots & \vdots & & \vdots \\ x_L & x_{L+1} & \ldots & x_N \end{bmatrix} \tag{2}$$

②. Decomposition is performed, and a covariance matrix of the trajectory matrix is calculated:

$$S = X \cdot X^T \tag{3}$$

Next, eigenvalue decomposition is performed on S to obtain $\lambda_1 > \lambda_2 > \ldots > \lambda_L \geq 0$ and corresponding eigenvectors $U_1, U_2, \ldots, U_L$. In this case, $U=[U_1, U_2, \ldots, U_L]$, $\sqrt{\lambda_1} > \sqrt{\lambda_2} > \ldots > \sqrt{\lambda_L} \geq 0$ is a singular spectrum of the original sequence, and:

$$X = \sum_{m=1}^{L} \sqrt{\lambda_m}\, U_m V_m^T,\ V_m = X^T U_m / \sqrt{\lambda_m},\ m = 1, 2, \ldots, L \tag{4}$$

where the eigenvector $U_m$ corresponding to $\lambda_m$ reflects an evolution type of the time sequence.

③. Grouping is performed, and it is assumed that all the L elements are grouped into c number of groups that are not crossed to each other based on a specific formula as follows:

$$X = X_{i_1} + \ldots + X_{i_c},\ \text{where } X_i = \sum_{m\in i} \sqrt{\lambda_m}\, U_m V_m^T = \left(\sum_{m\in i} U_m U_m^T\right) X \tag{5}$$

④. Reconstruction is performed, in which firstly a projection, on $U_m$, of a lagging sequence $X_i$ is calculated:

$$a_i^m = X_i U_m = \sum_{j=1}^{L} x_{i+j} U_{m,j},\ 0 \leq i \leq N-L \tag{6}$$

where $X_i$ represents an i-th column of the trajectory matrix X, and $$a_i^m$$

represents a weight of a time evolution type reflected by $X_i$, in time periods of the original sequence $x_{i+1}, X_{i+2}, \ldots, x_{i+L}$.

Next, a single is reconstructed by a time empirical orthogonal function and a time principal element, and a specific reconstruction process is as follows.

$$x_i^k = \begin{cases} \frac{1}{i}\sum_{j=1}^{i} a_{i-j}^k U_{k,j},\ 1 \leqslant i \leqslant L-1 \\ \frac{1}{L}\sum_{j=1}^{L} a_{i-j}^k U_{k,j},\ L \leqslant i \leqslant N-L+1 \\ \frac{1}{N-i+1}\sum_{j=i-N+L}^{L} a_{i-j}^k E_{k,j},\ N-L+2 \leqslant i \leqslant N \end{cases} \tag{7}$$

In this way, a reconstructed sequence is equal to the original sequence, that is:

$$x_i = \sum_{k=1}^{L} x_i^k,\ i = 1, 2 \ldots, N \tag{8}$$

where $$x_i^k$$

represents a k-th signal sorted according to importance. Therefore, through cross analysis and singular spectrum analysis, dominant attributes and principal components of the dominant attributes are obtained, thereby providing a data basis for subsequent reservoir prediction.

Figure 2:
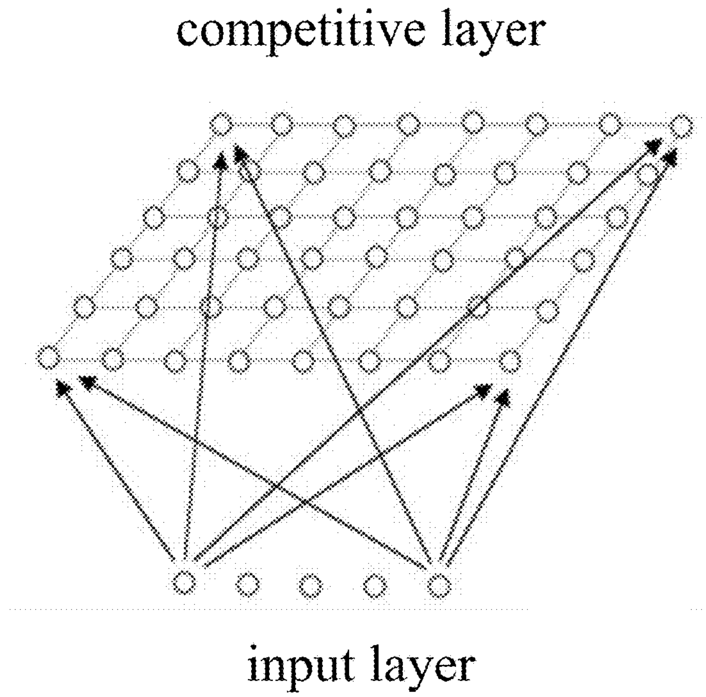
FIG. 2 is a schematic diagram of an SOM unsupervised clustering network model in a reservoir parameter prediction method provided in an embodiment one of the present disclosure.

(2) On the basis of preferable selection of a plurality of attributes, automatic division of waveform features is realized through an SOM unsupervised clustering algorithm (FIG. 2). A plurality of seismic attributes are preferably selected as input data, an SOM unsupervised network training model and a topological structure are designed, and a waveform classification result is outputted, thereby providing constraint data for subsequent reservoir parameter prediction. A specific SOM algorithm is as follows.

①. Initialization is performed, so as to initialize randomly, by each node, parameters of the node itself. The number of parameters of each node is the same as the dimension number of input data.

②. A node that best matches respective piece of input data, is found. Assuming that D-dimensional data is input, that is, X={x_i, i=1, . . . , D}, a discrimination function may be the Euclidean distance:

$$d_j(x) = \sum_{i=1}^{D} (x_i - w_{ji})^2 \tag{10}$$

③. After an active node I (x) is found, nodes adjacent thereto is expected to be updated. S_ij is made to indicate the distance between a node i and a node j, and updated weights are allocated to the nodes adjacent to the node I (x):

$$T_{j,I} = \exp\left(-\frac{s_{j,I(x)}^2}{2\delta^2}\right) \tag{11}$$

④. Next, the parameters of the nodes are updated. Updating is performed according to a gradient descent method:

$$\Delta w_{ji} = \eta(t) * T_{j,I(x)}(t) * (x_i - w_{ji}) \tag{12}$$

Iteration is performed until convergence is realized.

Therefore, automatic division of waveform features is realized through an SOM unsupervised automatic clustering technology in combination with a technology for preferable selection of a plurality of attributes based on cross analysis and SSA singular spectrum analysis.

(3) On the basis of waveform classification, different deep neural networks are further constructed with respect to different waveform features. Since seismic data is of a timing signal feature and well logging data also has certain association in a vertical direction, a long short term memory recurrent neural network (LSTM-RNN) is preferably selected to construct a nonlinear multi-network prediction model under different geological characteristics (FIG. 3).

Figure 3:
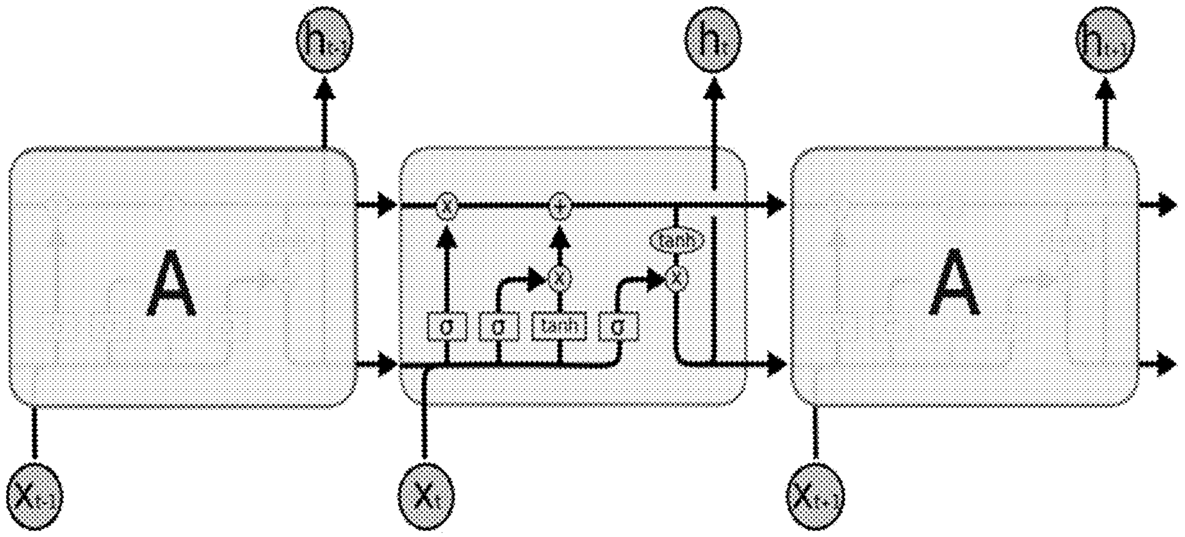
FIG. 3 is a schematic diagram of an LSTM-RNN model in a reservoir parameter prediction method provided in an embodiment one of the present disclosure.

FIG. 3 is a schematic diagram of an LSTM-RNN model. One LSTM unit is composed of three threshold structures and one state vector transmission line. The threshold structures are three gates including a forget gate, an input gate and an output gate. The state vector transmission line is responsible for long term memory, and is merely used to perform some simple linear operations. The three gates are responsible for short term selection, and a deletion or addition operation is performed on an input vector by setting thresholds for the gates.

Figure 4:
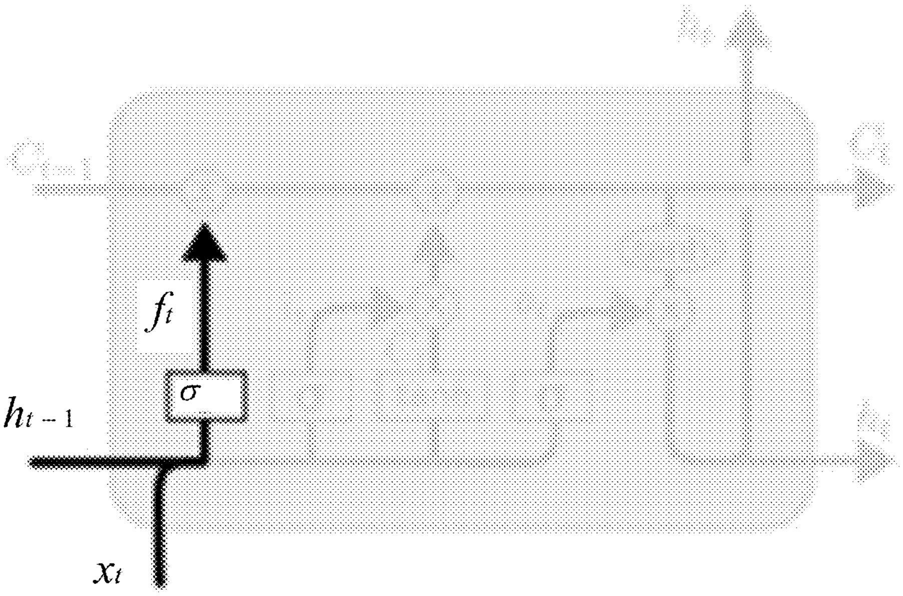
FIG. 4 is a schematic diagram of a forget gate in an LSTM-RNN model provided in an embodiment one of the present disclosure.

The forget gate (FIG. 4) is realized by a sigmoid neural layer, and the function of the forget gate is to decide which information is allowed to pass the unit. 0 indicates "no information is allowed to pass", and 1 indicates "all information is allowed to pass".

Figure 5:
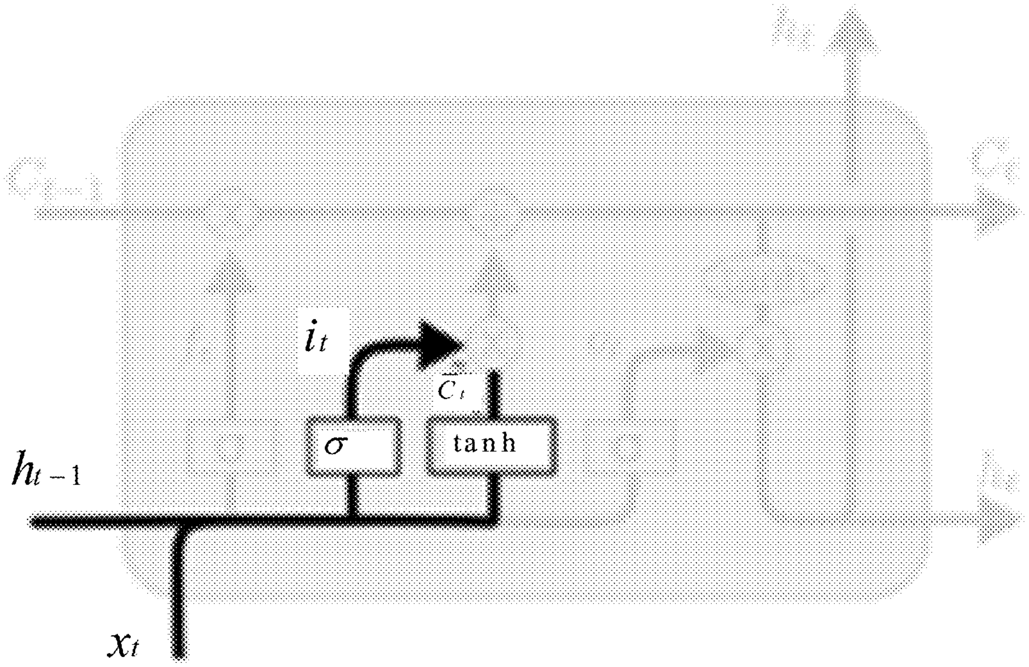
FIG. 5 is a schematic diagram of an input gate of an LSTM-RNN model provided in an embodiment one of the present disclosure.

The function of the input gate (FIG. 5) is to decide how much new information is allowed to a unit state. The realization of the input gate needs two steps. First, a sigmoid layer is provided to decide which information needs to be updated, and a tanh layer is provided to generate candidate information for updating contents. Next, vectors of the two layers are combined by dot product, so as to update the unit state.

Figure 6:
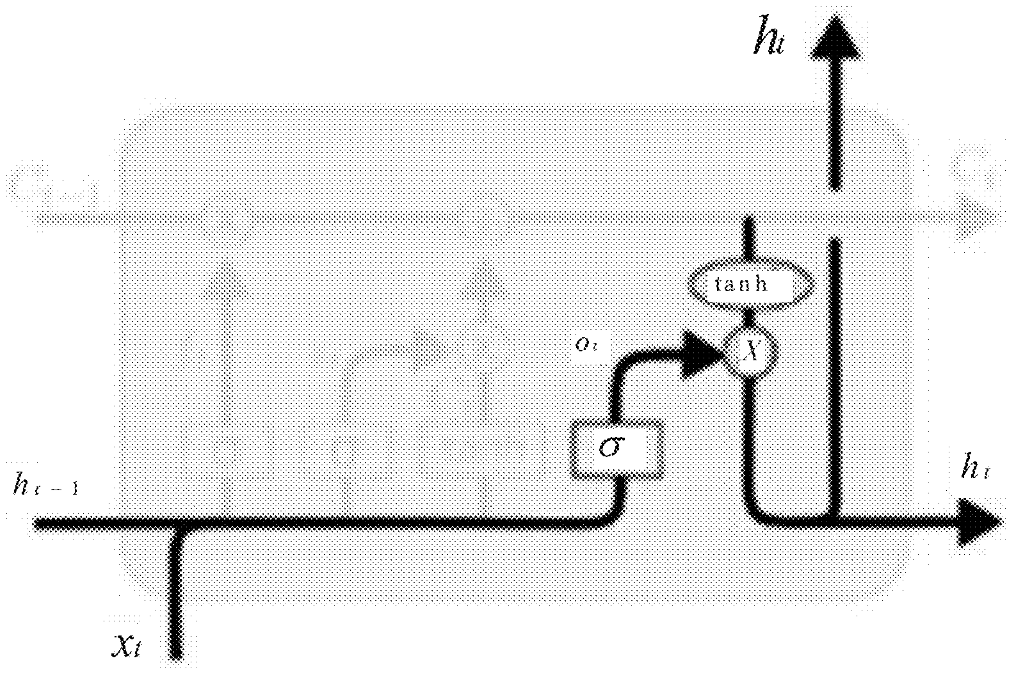
FIG. 6 is a schematic diagram of an output gate of an LSTM-RNN model provided in an embodiment one of the present disclosure.

The function of the output gate (FIG. 6) is to output a final result. The realization of the output gate needs two steps. First, which information may be outputted is decided by the sigmoid layer. Next, a state vector is made to pass through the tanh layer, and an output of the tanh layer is then multiplied by a weight calculated by the sigmoid layer, such that the final result to be output is obtained.

The specific mathematical process in the LSTM unit is as follows:

$$\begin{aligned} i_t &= \sigma(W_{xi}x_t + W_{hi}h_{t-1} + W_{ci}c_{t-1} + b_i) \\ f_t &= \sigma(W_{xf}x_t + W_{hf}h_{t-1} + W_{cf}c_{t-1} + b_f) \\ C_t &= f_t \cdot C_{t-1} + i_t \cdot (W_{xc}x_t + W_{hc}h_{t-1} + b_c) \\ o_t &= \sigma(W_{xo}x_t + W_{ho}h_{t-1} + W_{co}c_{t-1} + b_o) \\ h_t &= o_t \cdot \tanh(C_t) \end{aligned} \tag{13}$$

where i represents an input gate; o represents a logic sigmoid function; $W_{xi}$, $W_{hi}$ and $W_{ci}$ respectively represent weight matrixes between an input eigenvector and the input gate, between a hidden layer unit and the input gate, and between a unit activation vector and the input gate; $b_i$ represents an offset of the input gate; f represents a forget gate; $W_{xf}$, $W_{hf}$ and $W_{cf}$ respectively represent weight matrixes between the input eigenvector and the forget gate, between the hidden layer unit and the forget gate, and the unit activation vector and the forget gate; $b_f$ represents an offset of the forget gate; C represents the unit activation vector; $W_{xc}$ and $W_{hc}$ represent respectively weight matrixes between the input eigenvector and the unit activation vector and between the hidden layer unit and the unit activation vector, the weight matrixes are diagonal matrixes; $b_c$ represents an offset of an output gate; o represents an output gate; $W_{xo}$, $W_{ho}$ and $W_{co}$ respectively indicate weight matrixes between the input eigenvector and the output gate, between the hidden layer unit and the output gate, and between the unit activation vector and the output gate; $b_f$ represents an offset of the forget gate; t, as a subscript, represents a sampling moment; and tanh represents an activation function.

(4) A deep neural network model based on an LSTM-RNN is trained, and parameters of the network model are optimized and adjusted, such that the model is generalized and converges. Well-side data of the plurality of attributes is input to an input layer of the model; corresponding well logging elastic parameters, such as a P-wave velocity, is output from an output layer of the model; and a hidden layer of the model is composed of an LSTM unit, a full-connected layer, a dropout layer and a regression layer. The LSTM unit is configured to reserve timing features of well logging data and seismic data. The full-connected layer serves as a classifier of an entire training network. The dropout layer is configured to alleviate the occurrence of overfitting during a network training process, so as to have the effect of regularization. The regression layer serves as an output of the network training model.

Figure 7:
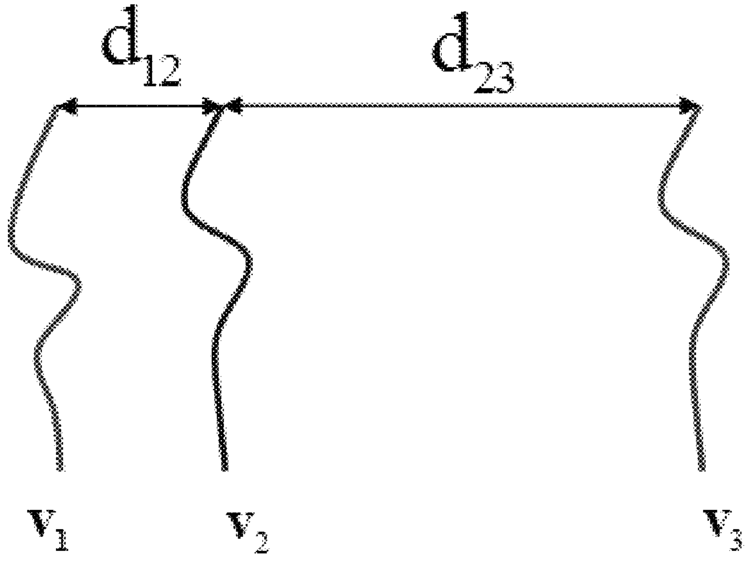
FIG. 7 is a schematic diagram of a spatial variation coefficient in a constructed set of spatial variation neural network prediction models provided in an embodiment one of the present disclosure.

(5) A set of spatial variation neural network prediction models is constructed. On the basis of the construction of the set of spatial variation neural network prediction models, spatial variation coefficients of each of the neural network models are constructed by the waveform similarity and spatial distance (FIG. 7), so as to realize the construction of the set of spatial variation neural network prediction models. A construction formula for the spatial variation coefficients is:

$$w = \lambda w_c + (1-\lambda)w_d \quad (14)$$

$$c_{12} = \sqrt{\frac{(v_1 - v_2)^T(v_1 - v_2)}{v_2^T v_2}} \quad (15)$$

$$d_{12} = \sqrt{\left(x_{v_1} - x_{v_2}\right)^T\left(x_{v_1} - x_{v_2}\right)} \quad (16)$$

$$w_c = \exp\left(-\alpha_c c_{12}^2\right) \quad (17)$$

$$w_d = \exp\left(-\alpha_d d_{12}^2\right) \quad (18)$$

In the formula, w represents spatial variation coefficient; $v_1$ represents a seismic trace of a constructed neural network model; $v_2$ represents a seismic trace of a neural network model to be constructed; $w_c$ represents an interpolation coefficient of the similarity between the seismic trace of the constructed neural network model and the seismic trace of the neural network model to be constructed; $w_d$ represents an interpolation coefficient of the distance between the seismic trace of the constructed neural network model and the seismic trace of the neural network model to be constructed; $c_{12}$ represents the correlation between $v_1$ and $v_2$; $d_{12}$ represents distance between the $v_1$ and $v_2$; $x_{v1}$ and $x_{v2}$ respectively represent the spatial positions of $v_1$ and $v_2$; $\lambda$ represents an adjustment factor; and $\alpha_c$ and $\alpha_d$ represent exponential factors.

In final, the construction of a set of spatial variation neural network prediction models is realized.

(6) The spatial elastic parameters are predicted. Taking the plurality of attributes as input data, elastic parameters as output data and the waveform classification result as constraint, the prediction of the spatial elastic parameters is realized via the set of spatial variation neural network prediction models.

$$V_p(i,j,k) = \begin{cases} w_{1,i,j} \cdot f_1(x_1, x_2, \ldots x_N) \\ x_{2,i,j} \cdot f_2(x_1, x_2, \ldots x_N) \\ \vdots \\ w_{3,i,j} \cdot f_k(x_1, x_2, \ldots x_N) \end{cases} \quad (19)$$

where $V_p$ represents a reservoir parameter; $f_k(x_1, x_2, \ldots x_N)$ represents a neural network prediction model corresponding to a k-th type of geological characteristics; $w_{k,i,j}$ represents a spatial variation coefficient of the neural network prediction model corresponding to the k-th type of geological characteristics; and $x_1, x_2, \ldots x_N$ represents the seismic attributes of different types.

Embodiment Two

Figures 9, 10:
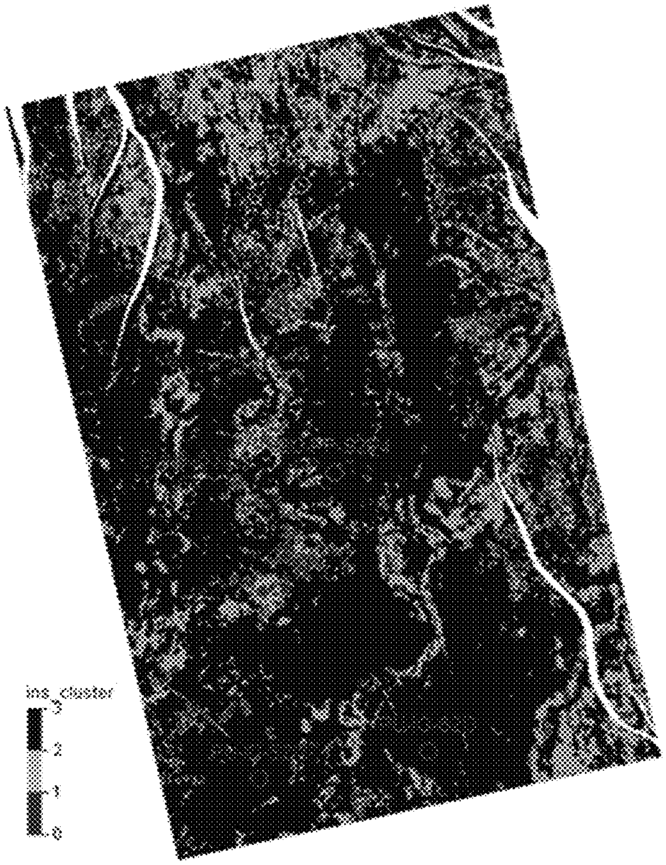
FIG. 9 is a schematic diagram of a slice, taken along a layer O72, of a waveform classification result provided in a second embodiment of the present disclosure.
FIG. 10 is a schematic diagram of input data to a deep neural network provided in an embodiment two of the present disclosure.
Figure 11:
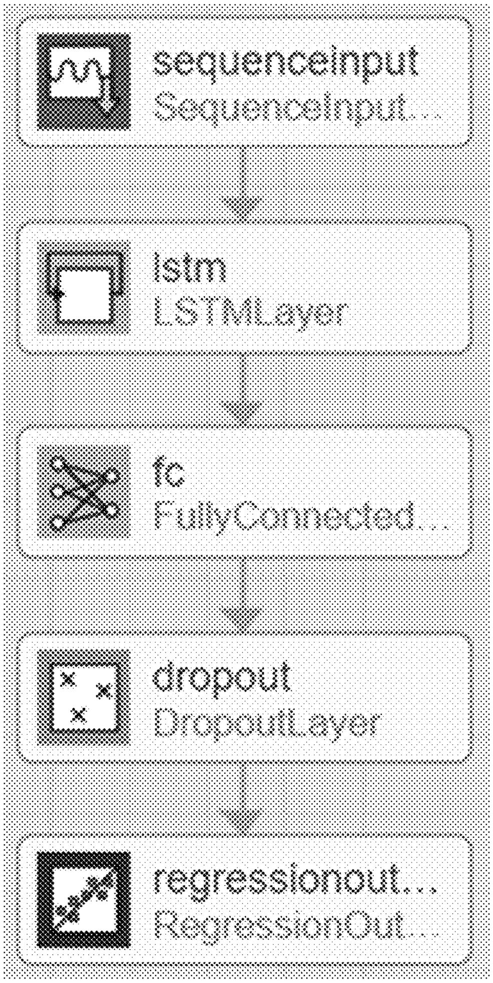
FIG. 11 is a schematic diagram of constructing a deep neural network model provided in an embodiment two of the present disclosure.
Figure 12A:
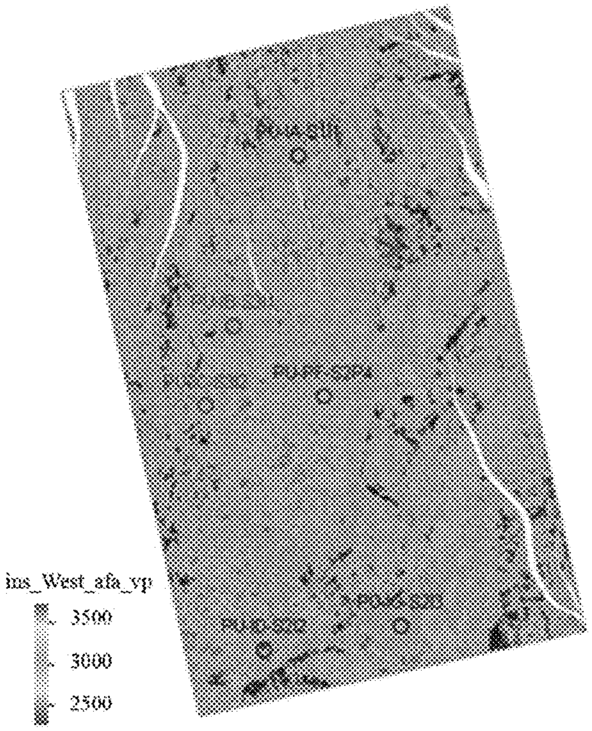
FIG. 12A is a schematic diagram of a slice, taken along a stratum, of a multi-model elastic parameter prediction result based on a deep neural network provided in an embodiment two of the present disclosure.
Figure 12B:
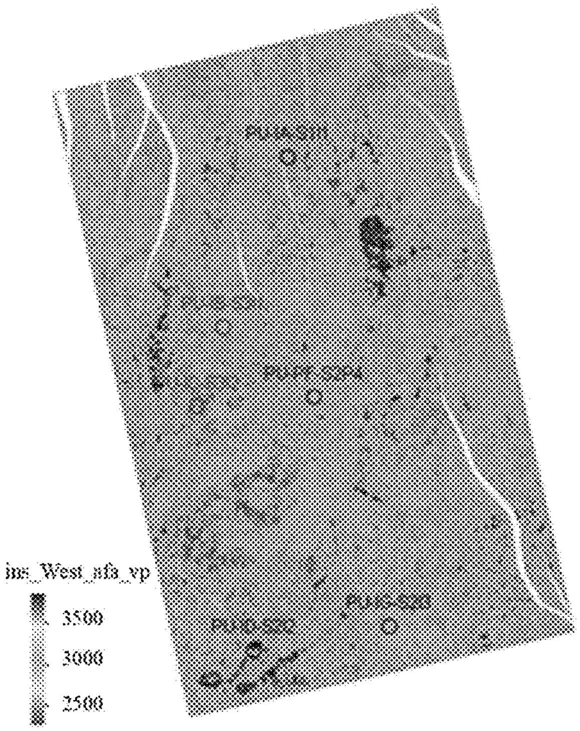
FIG. 12B is a schematic diagram of a slice, taken along a stratum, of a multi-model elastic parameter prediction result based on a deep neural network provided in an embodiment two of the present disclosure.
Figure 12C:
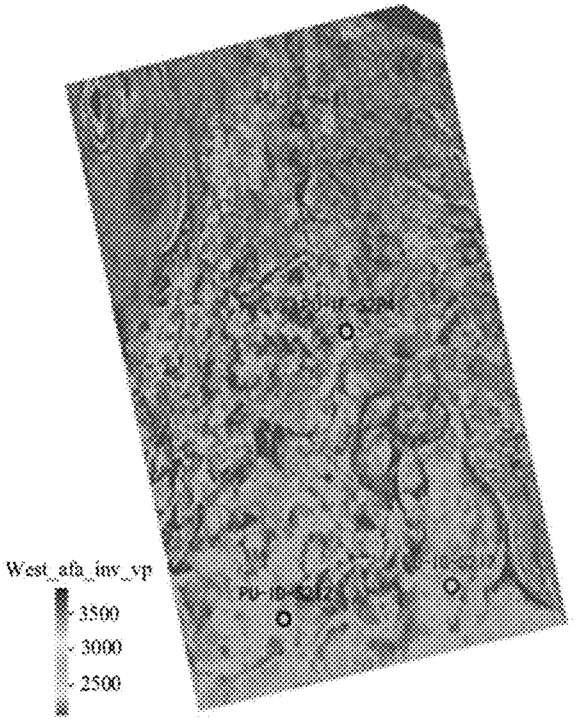
FIG. 12C is a schematic diagram of a slice, taken along a stratum, of a time domain inversion result provided in an embodiment two of the present disclosure.
Figure 12D:
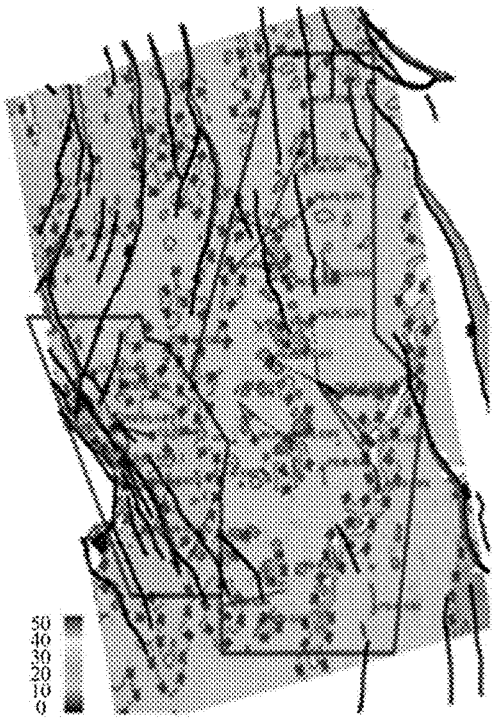
FIG. 12D is a schematic diagram of an engineering development deployment solution provided in an embodiment two of the present disclosure.

The effectiveness of the method of the present disclosure will be described below through actual data of a certain work area. The work area is of a clastic rock reservoir type, with two reservoirs developed at distinct seismic horizons, namely layer O72 and layer O73. The layer O72 is turbidity channel sheet sandstone. The development across the work area is stable. There are three effective logging wells in total in the work area, respectively a well PU_IA, a well PU_IB and a well PU_IC. First, a plurality of attributes are preferably selected on the basis of cross analysis and singular spectrum analysis (FIG. 8). The preferably selected attributes to be input are respectively: an envelope attribute, relative wave impedance and an instantaneous amplitude attribute, and is used to perform waveform classification in combination with an SOM unsupervised clustering algorithm (FIG. 9). Waveforms are classified into three classes, namely, a waveform having relatively low energy, a waveform having medium energy, and a waveform having high energy respectively corresponding to the well PU_IC, the well PU_IB and the well PU_IA. On the basis of waveform classification, a deep neural network is trained with respect to different waveform features. Preferably, input data (FIG. 10) includes: a seismic trace, an envelope attribute, a thin-layer factor, relative wave impedance, a Hilbert attribute, an instantaneous frequency, a dominant frequency and an instantaneous phase attribute. Output data is a longitudinal wave velocity. A five-layer deep neural network (FIG. 11) is designed for the construction of a prediction model, and a waveform classification result is regarded as constraint data. In final, multi-model elastic parameter prediction based on a deep recurrent neural network is realized.

A result of multi-model elastic parameter prediction based on a deep neural network is compared with a result of single-model elastic parameter prediction based on a deep neural network, a time domain inversion result and an engineering development deployment solution (FIGS. 12A-12D). It can be seen from a planar tendency that, compared with a longitudinal wave velocity on the basis of a single-model prediction, the present disclosure has higher spatial prediction accuracy, and better reserves overall macroscopic characteristics. It can be seen from the comparison between the present disclosure and the time-domain inversion result that, since the time-domain inversion result is limited by a well and an initial model, the inversion result cannot greatly represent macroscopic geological characteristics. Through comprehensive analysis of FIGS. 12A-12D, an elastic parameter direct prediction technology based on a plurality of models has higher spatial prediction accuracy, and has better consistency with the development deployment solution.

Figure 13A:
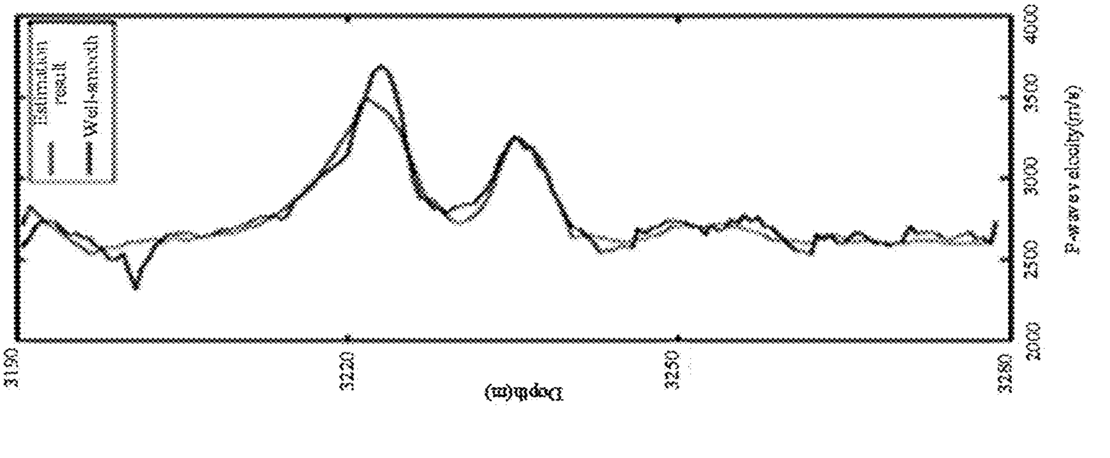
FIG. 13A is a comparison graph of an original well logging curve of a PU_IA well and a multi-model prediction result provided in an embodiment two of the present disclosure.
Figure 13B:
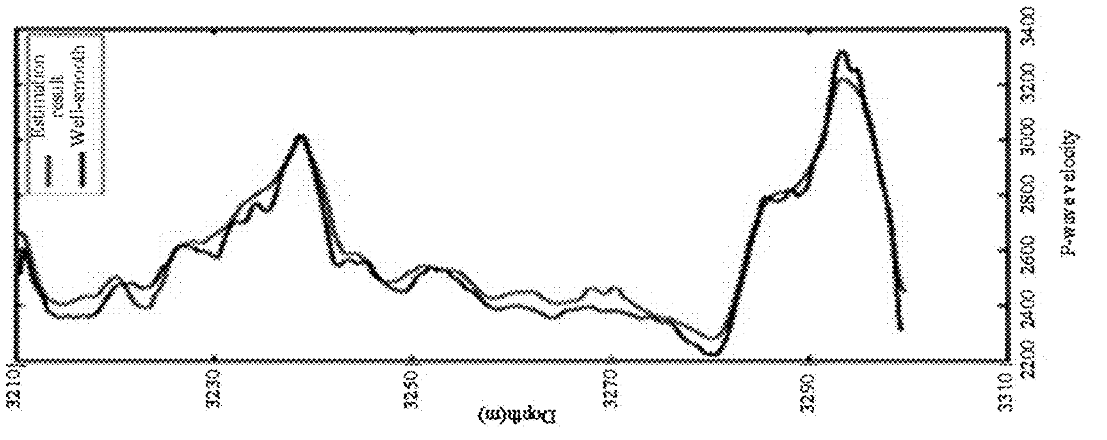
FIG. 13B is a comparison graph of an original well logging curve of a PU_IB well and a multi-model prediction result provided in an embodiment two of the present disclosure.
Figure 13C:
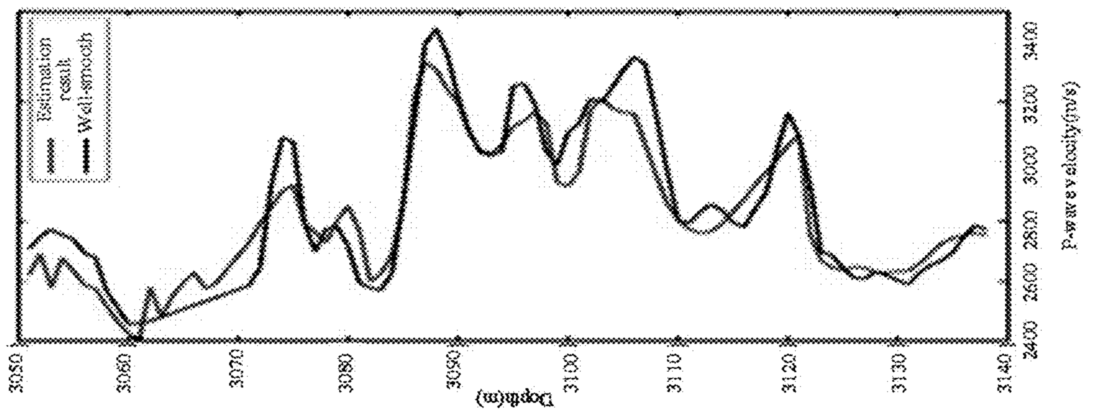
FIG. 13C is a comparison graph of an original well logging curve of a PU_IC well and a multi-model prediction result provided in an embodiment two of the present disclosure.
Figure 13D:
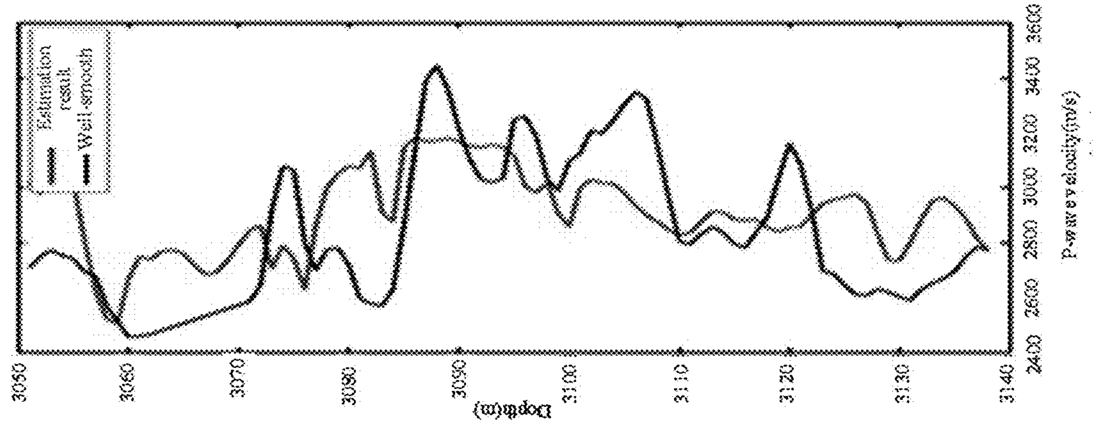
FIG. 13D is a comparison graph of an original well logging curve of a PU_IC well and a single-model prediction result provided in an embodiment two of the present disclosure.

By comparison between multi-model-based prediction results of the wells PU_IA, PU_IB and PU_IC and original well logging curves (FIGS. 13A to 13C), it can be seen that the prediction result of the longitudinal wave velocity is consistent with an overall tendency of the original well logging curve, and is highly consistent with the well. Furthermore, a multi-model prediction result of the well PU_IC is compared with a single-model prediction result thereof. It can be seen that precision of P-wave velocity prediction based on multi-model prediction is higher than that of P-wave velocity prediction based on single-model prediction.

In summary, on the basis of the reservoir parameter direction prediction technology based on an LSTM-RNN developed in the present disclosure, the reservoir parameter direct prediction based on the set of spatial variation neural network models is realized, thereby effectively maintaining a geological stratum structure and further enhancing the accuracy of reservoir parameter prediction.

Embodiment Three

On the basis of the previous embodiment, the present embodiment provides a reservoir parameter prediction apparatus. The reservoir parameter prediction apparatus includes an attribute screening unit, a waveform classification unit, a model construction unit, a model training unit, a model fusion unit and parameter prediction unit.

The attribute screening unit is configured to analyze the relevance between the seismic attributes of different types of the target stratum and the reservoir parameters by using seismic data and well logging data of the target stratum, and to select dominant seismic attributes from the seismic attributes of different types according to a magnitude of the relevance. The attribute screening unit may be implemented by a processor executing correlation analysis algorithms to evaluate the relevance between seismic attributes of different types and reservoir parameters. The algorithms may include, for example, statistical correlation analysis, principal component analysis (PCA), cross-plotting, or regression-based methods. Based on the calculated relevance magnitude, the processor selects dominant seismic attributes as input features for subsequent classification and model construction.

The waveform classification unit is configured to classify, on the basis of the dominant seismic attributes, seismic waveforms of the target stratum by a preset waveform classification network model and according to waveform features, so as to obtain a waveform classification result, with different types of waveforms correspondingly representing different geological characteristics. The waveform classification unit may be implemented by a processor running a neural network classification algorithm, which takes waveform features and seismic attributes as input and outputs waveform classes.

The model construction unit is configured to construct different deep neural network models corresponding to the different geological characteristics with the seismic attributes as an input, the reservoir parameters as an output, and the waveform classification result as constraint. The model construction unit may be implemented by a processor or a model construction engine executing model initialization and architecture definition instructions, thereby constructing different neural network models corresponding to different geological characteristics.

The model training unit is configured to train the different deep neural network models by using seismic data and well logging data of the target stratum as training data and predicted data, so as to optimize model parameters of each of the deep neural network models. The model training unit may be implemented by a processor or a model training engine executing a training algorithm, such as stochastic gradient descent or Adam optimizer, to adjust parameters of each neural network model using seismic data and well logging data.

The model fusion unit is configured to fuse different trained deep neural network models into a set of spatial variation neural network prediction models. The model fusion unit may be implemented by a processor or a model fusion engine executing a weighted averaging or ensemble learning algorithm (e.g., Bagging or Stacking), in which the fusion weights are constrained by waveform classification results and spatial variation coefficients.

The parameter prediction unit is configured to predict the reservoir parameters of the target stratum by using the set of spatial variation neural network prediction models. The parameter prediction unit may be implemented by a processor executing inference instructions, which apply the trained and fused model ensemble to new seismic input data to generate reservoir parameter predictions.

Embodiment Four

In addition, the present embodiment provides a computer storage medium. The computer storage medium stores a computer program thereon.

The computer program, when executed by one or more computer processor, is configured to implement the above mentioned reservoir parameter prediction method.

The above mentioned storage medium may be a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, an application (APP) store, and the like.

Embodiment Five

In addition, the present embodiment provides a computer device. The computer device includes a memory and a processor.

The memory stores a computer program thereon, and the computer program, when executed by the processor, executes the above mentioned reservoir parameter prediction method.

The processor may be implemented as an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements, and the processor may be used to execute the reservoir parameter prediction method in any one of the embodiment one to the embodiment five.

The memory may be implemented as any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

It should be understood that unit refers to a functional component that can be executed by software, hardware, or a combination of software and hardware. In the technical background disclosed in this application, those skilled in the art can understand it as a known structural component. The functions described in each unit (such as analysis, classification, construction, training, fusion, prediction) are implemented through algorithms, deep learning models, and computational processes, or through firmware carrying algorithms, deep learning models, and computational processes, or a combination of multiple such firmware. These contents have been fully disclosed in the description. For example, the description mentions that each unit is implemented through programs, code, or instructions executed by a computer. The various functional components of the unit can be arranged in a decentralized or integrated manner, and the technical definition of the unit is limited only by the functions it is intended to perform, without any physical or geographical limitations. These units correspond to the specific structures described in detail in the description, such as neural network models, classification components, fusion strategies, etc., and are elaborated in the technical details section (such as the construction of spatial variation models, SOM classification, and waveform similarity based fusion).

It should be understood that the apparatus and method embodiments described in the above embodiments are merely illustrative. For example, the flowcharts and the block diagrams in the accompanying drawings display a system architecture, a function and an operation that may be implemented by the apparatus, the method and the computer program product according to the various embodiments of the present disclosure. In this regard, each block in the flowcharts and the block diagrams may represent a part of a module, a program section or a code, and the part of the module, the program section or the code contains one or more executable instructions that are used for implementing a designated logic function. It should also be noted that, in some alternative implementations, a function indicated in the block may also be implemented in an order different from that indicated in the accompanying drawings. For example, two continuous blocks can actually be executed basically concurrently, and sometime, they can also be executed in an opposite order, which is determined according to a function involved. It also needs to be noted that each block in the block diagrams and/or flowcharts, and a combination of blocks in the block diagrams and/or flowcharts can also be implemented by a specific hardware-based system that executes a designated function or action, or can also be implemented by a combination of specific hardware and a computer instruction.

In addition, various functional modules in the various embodiments of the present disclosure may be integrated into one independent part, or various modules may be present separately, or two or more modules may be integrated into one independent part.

If the function is realized in the form of a software functional module, and is sold or used as an independent product, the function may be stored in a computer-readable storage medium. Based on such understanding, the technical solution of the present disclosure, in essence or the contribution to the prior art, or part of the technical solution may be embodied in the form of a software product. The computer software product is stored in a storage medium, and includes a plurality of instructions used to cause a computer device (which may be a personal computer, a server, or a network device, etc.) to perform all or part of the steps of the method described in various embodiments of the present disclosure.

It also needs to be noted that the foregoing description is merely preferred embodiments of the present disclosure and is not used for limiting the present disclosure, and various changes and modifications may be made to the present disclosure by those skilled in the art. Within the spirit and principle of the disclosure, any modifications, equivalent replacements, improvements, etc., shall be contained within the scope of protection of the present disclosure. It should be noted that similar reference signs and letters refer to similar items in the following drawings. Therefore, once a specific item is defined in one of the drawings, it need not be further defined and explained in subsequent drawings.

The invention claimed is:

1. A reservoir parameter prediction method based on geological characteristic constraint, comprising:

generating, by excitation of one or more seismic sources, artificial seismic waves towards a target stratum, and acquiring seismic attributes of different types in the seismic waves from the target stratum, obtaining, at a plurality of logging well positions in the target stratum, well logging data;

selecting, by an attribute screening unit, dominant seismic attributes from the seismic attributes of different types according to relevance between the seismic attributes of different types of the target stratum and reservoir parameters;

classifying, by a waveform classification unit, seismic waveforms of the target stratum by a preset waveform classification network model, according to waveform features and on the basis of the dominant seismic attributes, so as to obtain a waveform classification result, waveforms of different types correspondingly representing different geological characteristics;

constructing, by a model construction unit, a plurality of deep neural network models at the plurality of logging well positions, using the different geological characteristics with the seismic attributes as an input, the reservoir parameters as an output, and the waveform classification result as constraint;

training, by a model training unit, the plurality of deep neural network models based on seismic data, the seismic attributes and well logging data of the target stratum, so as to optimize model parameters of each of the deep neural network models;

fusing the plurality of trained deep neural network models into a set of spatial variation neural network prediction models;

predicting the reservoir parameters of the target stratum by the set of spatial variation neural network prediction models; and applying the predicted reservoir parameters to well placement planning.

2. The reservoir parameter prediction method of claim 1, wherein selecting dominant seismic attributes from the seismic attributes of different types according to relevance between the seismic attributes of different types of the target stratum and reservoir parameters comprises:

determining the relevance between the seismic attributes of different types of the target stratum and the reservoir parameters through cross analysis by the seismic data and the well logging data of the target stratum, and selecting seismic attributes, the relevance between which and the reservoir parameters exceeds a preset relevance threshold value, from the seismic attributes of different types as the dominant seismic attributes, according to a magnitude of the relevance; and decomposing and reconstructing data of each of the dominant seismic attributes through singular spectrum analysis, wherein a sequence component in a reconstructed sequence that has a contribution degree greater than a preset contribution threshold value is reserved as a dominant component of a dominant seismic attribute according to the contribution degree to the dominant seismic attribute.

3. The reservoir parameter prediction method of claim 1, wherein classifying seismic waveforms of the target stratum by a preset waveform classification network model, according to waveform features and on the basis of the dominant seismic attributes, so as to obtain a waveform classification result comprises that the waveform classification network model is an SOM (Self-Organizing Map) unsupervised network model designed on a basis of an SOM unsupervised clustering algorithm, and the waveform classification network model comprises a seismic attribute input layer and a classification result output layer.

4. The reservoir parameter prediction method of claim 1, wherein the geological characteristics comprise a sedimentation characteristic.

5. The reservoir parameter prediction method of claim 1, wherein constructing, by model construction unit, a plurality of deep neural network models at the plurality of logging well positions, using the different geological characteristics with the seismic attributes as an input, the reservoir parameters as an output, and the waveform classification result as constraint comprises that each of the deep neural network models is an LSTM-RNN (Long Short-Term Memory Recurrent Neural Network) model, and each of the deep neural network models comprises a seismic attribute input layer, a reservoir parameter output layer and a hidden layer between the seismic attribute input layer and the reservoir parameter output layer, and the hidden layer comprises:

an LSTM unit configured to reserve timing features of seismic data and well logging data;

a full-connected layer as a classifier of a network training model;

a dropout layer configured to alleviate overfitting during a network model training process; and a regression layer as an output of the network training model.

6. The reservoir parameter prediction method of claim 1, wherein training different deep neural network models at different logging well positions based on seismic data, the seismic attributes and well logging data of the target stratum further comprises:

performing smoothing process on the well logging data, such that a spectrum of the well logging data subjected to the smoothing process matches a spectrum of the seismic data;

performing normalization process on the matched seismic data and well logging data;

with top and bottom of the target stratum as boundaries, intercepting seismic data and well logging data within a range of the target stratum from the seismic data and the well logging data subjected to the normalization process; and training the different deep neural network models by the seismic data and the well logging data within the range of the target stratum, so as to optimize the model parameters of each of the deep neural network models.

7. The reservoir parameter prediction method of claim 1, wherein fusing a plurality of trained deep neural network models obtained by the CPU/GPU computing nodes at the different logging well positions into a set of spatial variation neural network prediction models comprises that a spatial variation coefficient of each of trained deep neural network models in the set of spatial variation neural network prediction models is determined on the basis of waveform similarity and spatial distance.

8. The reservoir parameter prediction method of claim 1, wherein a spatial variation coefficient of each of trained deep neural network models in the set of spatial variation neural network prediction models is determined according to a following formula:

$$w = \lambda w_c + (1 - \lambda) w_d$$

$$c_{12} = \sqrt{\frac{(v_1 - v_2)^T (v_1 - v_2)}{v_2^T v_2}}$$

$$d_{12} = \sqrt{(x_{v_1} - x_{v_2})^T (x_{v_1} - x_{v_2})}$$

$$w_c = \exp(-\alpha_c c_{12}^2)$$

$$w_d = \exp(-\alpha_d d_{1212}^2)$$

wherein in the formula, w represents a spatial variation coefficient, $v_1$ represents a seismic trace of a constructed deep neural network model, $v_2$ represents a seismic trace of a deep neural network model to be constructed, $w_c$ represents an interpolation coefficient of similarity between the seismic trace of the constructed deep neural network model and the seismic trace of the deep neural network model to be constructed, $w_d$ represents an interpolation coefficient of a distance between the seismic trace of the constructed deep neural network model and the seismic trace of the deep neural network model to be constructed, $c_{12}$ represents correlation between $v_1$ and $v_2$, $d_{12}$ represents a distance between $v_1$ and $v_2$, $x_{v1}$ and $x_{v2}$ respectively represent spatial positions of $v_1$ and $v_2$, λ represents an adjustment factor, and $\alpha_c$ and $\alpha_d$ represent exponential factors.

9. The reservoir parameter prediction method of claim 1, wherein the reservoir parameters of the target stratum comprise spatial three-dimensional elastic parameters of the target stratum, and the method further comprises outputting a distribution graph of the spatial three-dimensional elastic parameters of the target stratum.

10. A computer storage medium storing thereon a computer program executable by a processor, wherein when executed by the processor, the computer program is executed to implement the reservoir parameter prediction method based on geological characteristic constraint of claim 1.

11. A computer device, comprising a memory and a processor, wherein a computer program stored on the memory is executed by the processor, and the computer program is executed to implement the reservoir parameter prediction method based on geological characteristic constraint of claim 1.

12. A reservoir parameter prediction apparatus based on geological characteristic constraint, comprising:

a data acquisition unit which acquires seismic attributes of different types in the seismic waves from the target stratum, including seismic data and well logging data;

an attribute screening unit which analyzes relevance between the seismic attributes of different types of the target stratum and reservoir parameters by seismic data and well logging data of the target stratum, and to select dominant seismic attributes from the seismic attributes of different types according to a magnitude of the relevance;

a waveform classification unit which classifies, on a basis of the dominant seismic attributes, seismic waveforms of the target stratum by a preset waveform classification network model and according to waveform features, so as to obtain a waveform classification result, with waveforms of different types correspondingly representing different geological characteristics;

a model construction unit which constructs different deep neural network models corresponding to the different geological characteristics with the seismic attributes as an input, the reservoir parameters as an output, and the waveform classification result as constraint;

a model training unit which trains the deep neural network models at different logging well positions based on the seismic data, the seismic attributes and the well logging data of the target stratum, so as to optimize model parameters of each of the deep neural network models by fusing different trained deep neural network models into a set of spatial variation neural network prediction models according to the following formula:

$$V_p(i, j, k) = \begin{cases} w_{1,i,j} \cdot f_1(x_1, x_2, \ldots x_N) \\ x_{2,i,j} \cdot f_2(x_1, x_2, \ldots x_N) \\ \vdots \\ w_{k,i,j} \cdot f_k(x_1, x_2, \ldots x_N) \end{cases},$$

wherein i and j collectively represent a location in a plane, $V_p$ represents a reservoir parameter, $f_k(x_1, x_2, \ldots x_N)$ represents a deep neural network model under a k-th type of geological characteristics, $w_{k,i,j}$ represents a spatial variation coefficient of the deep neural network model under the k-th type of geological characteristics, and $x_1, x_2, \ldots x_N$ represents 1 to N types of seismic attributes;

a parameter prediction unit which predicts the reservoir parameters of the target stratum by the set of spatial variation neural network prediction models; and a computing system which applies the predicted reservoir parameters to well placement planning.

* * * * *